United States Patent
Naaman et al.

(10) Patent No.: US 6,507,017 B1
(45) Date of Patent: Jan. 14, 2003

(54) NEAR-FIELD OPTICAL INSPECTION APPARATUS

(75) Inventors: Ron Naaman, Nes Ziona (IL); Zeev Vager, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/719,313

(22) PCT Filed: May 18, 1999

(86) PCT No.: PCT/IL99/00262
§ 371 (c)(1),
(2), (4) Date: May 16, 2001

(87) PCT Pub. No.: WO99/64909
PCT Pub. Date: Dec. 16, 1999

(30) Foreign Application Priority Data

Jun. 10, 1998 (IL) .................................................. 124838

(51) Int. Cl.$^7$ ............................. H01J 3/14; H01J 40/14; H01J 5/16
(52) U.S. Cl. ........................................ 250/234; 250/306
(58) Field of Search .................................. 250/234, 235, 250/227.11, 227.26, 227.28, 310, 216, 306–311; 356/501; 73/105

(56) References Cited

U.S. PATENT DOCUMENTS 4,947,034 A    8/1990    Wickramasinghe et al.
5,018,865 A    5/1991    Ferrell et al.
5,508,805 A    4/1996    Muranishi et al.
5,633,972 A    5/1997    Walt et al.
5,773,835 A  * 6/1998    Sinofsky .................. 250/462.1
6,046,972 A  * 4/2000    Kuroda et al. .............. 250/234

FOREIGN PATENT DOCUMENTS

EP    0 507 628 A2      4/1992
EP      0507628 A2  *  7/1992    ........... G02B/21/00
EP    0 622 652 A1      4/1994

* cited by examiner

Primary Examiner—Stephone B. Allen
Assistant Examiner—Stephen Yam
(74) Attorney, Agent, or Firm—Browdy and Neimark

(57) ABSTRACT

An apparatus (1) for optical inspection of an article(s) is presented. The apparatus utilizes near-field illumination, and comprises a light source unit (4) generating incident light, a detector unit (14), a fiber bundle for directing (16C) the incident light onto a substantially large surface area (2A) of the article and collecting light (16B) returned from the illuminated surface area, and a control means (28). The control means comprises sensing means consisting of at least three tips for atomic force (AFM) or current tunneling (STM) measurement at sample surface, and is capable of adjusting the position of the fiber bundle relative to the surface of the article.

6 Claims, 2 Drawing Sheets

NEAR-FIELD OPTICAL INSPECTION APPARATUS

FIELD OF THE INVENTION

The present invention is in the field of high resolution scanning techniques and relates to an apparatus for near-field optical inspection of articles, particularly useful for inspecting a substantially large surface area with very high spatial resolution.

BACKGROUND OF THE INVENTION

There is a great variety of scanning systems having a common goal of increasing the system's resolution. It is known that the resolution depends on the diameter of a light beam striking the object, namely the less the diameter of the beam, the higher the resolution of the system. Near-field applications such as optical data storage, inspection, microscopy, etc., solve the resolution problem by generating a point-like light source, having dimensions smaller than the light wavelength. This is typically achieved either by defining small apertures on opaque screens, or, alternatively, by passing the light through point-like tips of sub-wavelength dimensions. The tips (constituting point-like light sources) are located at very close proximity of the object, in order to provide high optical resolution of the scanning system.

One example of a near-field optical microscope that utilizes a point-like tip and allows for inspecting a sample with substantially nano-scale resolution is disclosed in U.S. Pat. No. 4,947,034. A light beam illuminates the tip and a portion of light striking the tip scatters and forms local evanescent fields from the very end region of the tip to the sample surface, which is in proximity to the tip. The evanescent fields very close to the tip interact with the surface atoms of the sample. The optical properties of the sample's surface are measured in the following manner. First and second dither motions of different frequencies are applied to the tip relative to the sample (or vice versa) in directions, respectively, normal and parallel to the plane defined by the surface of the sample. Then, light scattered from the end of the tip and the sample is detected. In order to measure the entire surface, the sample is supported for movement in the X and Y directions beneath the stationary tip. The motion of the sample relative to the tip is controlled by X- and Y-piezoelectric drives, while the oscillation of the tip in Z-direction is controlled by Z-piezoelectric drive.

Another example of an apparatus for near-field optical microscopy is disclosed in U.S. Pat. No. 5,018,865. A photon scanning tunneling microscope is developed using a phenomenon of sample-modulated tunneling of photons in a near field to produce information about the sample. The evanescent near-field is produced by utilizing the effect of total internal reflection of a light beam incident on an interface between the materials of different refraction indices, when the incident beam lies in the medium of higher index. The intensity of this near field increases perpendicular to and towards the surface of the sample and has substantially constant intensity in a plane substantially parallel to the surface. To this end, the sample is placed within the near field and the presence of that sample changes the intensity distribution within the near-field, which is probed by an optical fiber probe tip. Photons from the incident beam tunnel through the region between the tip and the sample and can be collected by a suitable detection system. The intensity of the near field is measured adjacent to the sample, the measurement producing an image corresponding to the measured area of the sample. A feedback circuit is employed to regulate the intensity of the signal by varying the tip to sample distance, preventing thereby the tip from contacting the sample.

U.S. Pat. No. 5,508,805 discloses an optical scanning type tunneling microscope utilizing an optical probe. According to this technique, reference light is provided in addition to light projected to a sample, and an effect of interference between the reference light and light picked up from an optical probe is utilized to obtain phase information of light about a region on the sample having very small dimensions (smaller than a wavelength of emitted light). The optical probe is formed with a tip-like projection on its surface facing the sample. The tip serves for picking up or extracting evanescent waves, which are generated on the surface of a glass substrate supporting the sample and around the sample, wherein the generation of these evanescent waves is caused by the incidence of measuring light upon the glass substrate. This optical probe comprises three fused single-mode optical fibers, the first fiber serving for transferring the reference light into the second fiber optically coupled with the first fiber, and the third fiber serving for detecting a relative position of this fiber relative to the surface of the sample. The tip-like projection is formed on the distal end of the second fiber, which thereby conveys both the transferred reference light and the collected, measured light.

European Publication No. 0507628 discloses a near field scanning optical microscope aimed at improving the resolution of the microscope by utilizing a light source emitting light in a pulse-like manner, an optical probe (near field optical means), and a detector operable in synchronism with the pulsed light from the light source. The optical microscope may also utilize an STM (or AFM) that detects data on the surface relief of the sample. The output of the STM can be used for maintaining a constant distance between the optical probe and the surface of the sample. To this end, however, the STM and the optical probe are kept at a known distance from each other, and the output of the STM indicative of the surface relief is recorded to be used for positioning the optical probe when reaching a specific location on the sample (the recorded recess or projection).

Most of the inspection systems of the kind specified, especially those used for inspecting patterned articles, are aimed at covering a large surface area (hundred square centimeters in a few minutes). The term "patterned article" signifies an article formed with regions (features) having different optical properties in respect of incident radiation. The use of a plurality of nano-probes (tips) seems to be the simplest solution of achieving both goals, namely increasing the resolution and measured area. Unfortunately, this approach does not ensure reproducible results because it scales the cost linearly with the number of probes, wherein each such nano-probe has its own characteristics. This requires a very complicated image processing technique, if any, for successfully mapping the surface area scanned by the entire probes.

U.S. Pat. No. 5,633,972 discloses an aperture-based imaging fiber for generating a plurality of subwavelength light energy beams concurrently to be used for near field viewing. The use of such a fiber for illuminating a specimen is aimed at reducing image acquisition time.

SUMMARY OF THE INVENTION

There is accordingly need in the art to overcome the disadvantages of the conventional techniques by providing a novel apparatus for near-field optical inspection.

It is a major object of the present invention to provide such an apparatus that enables to obtain simultaneously high-resolution image from a large area.

It is a further object of the present invention to provide such an apparatus that allows for combining the principles of optical and scanning tunneling microscopy for successfully inspecting articles.

There is thus provided according to the present invention an apparatus for optical inspection of an article utilizing near-field illumination, the apparatus comprising:

(a) a light source unit generating incident light for illuminating the surface of the article;

(b) a detector unit for sensing light signals and providing data representative thereof;

(c) a fiber bundle for directing said incident light onto a substantially large surface area of the article and collecting light returned from the illuminated surface area; and (d) a control means for adjusting the position of the fiber bundle relative to the surface of the article.

The main idea of the present invention consists of the following. The fiber bundle is used for directing the incident radiation onto the surface of the article to be inspected. The fiber bundle comprises a group of illuminating fibers extending between the light source unit and the surface, generating thereby the plurality of point-like light sources illuminating together the substantially large surface area of the article. These point-like light sources are located in a plane defined by an outer surface of the fiber bundle close to the surface of the article. Additionally, the fiber bundle comprises a plurality of light connecting fibers extending between the surface of the article and the detector unit for directing light returned (scattered or emitted) from the illuminated area to the detector unit. It is understood that the desired vertical position of the plane, in which the point-like light sources are located relative to the article, should be maintained so as to ensure the proximity of the bundle to the surface of the article under inspection. To this end, the control means is constructed and operated so as to utilize the principles of either scanning tunneling microscopy (STM) or atomic force microscopy (AFM). The control means comprises at least three small sensing tips attached to the fiber bundle for operating in either STM or AFM mode, and a feed back electronic loop.

Preferably, the ends of the illuminating and collecting fibers located in the close proximity of the article are mixed so as to still more increase the illuminated area.

The advantages of the present invention are thus self-evident. On the one hand, the provision of the fiber bundle enables both the resolution and scan area to be significantly increased. On the other hand, the provision of at least three tips using STM or AFM mode allows for successfully detecting and desirably adjusting the vertical position of the entire plane of location of the plurality of point-like light sources relative to the article.

BRIEF DESCRIPTION OF THE DRAWINGS

In order to understand the invention and to see how it may be carried out in practice, a preferred embodiment with now be described by way of non-limiting example only, with reference to the accompanying drawings, in which.

DETAILED DESCRIPTION OF A PREFERRED EMBODIMENT

Figure 1:
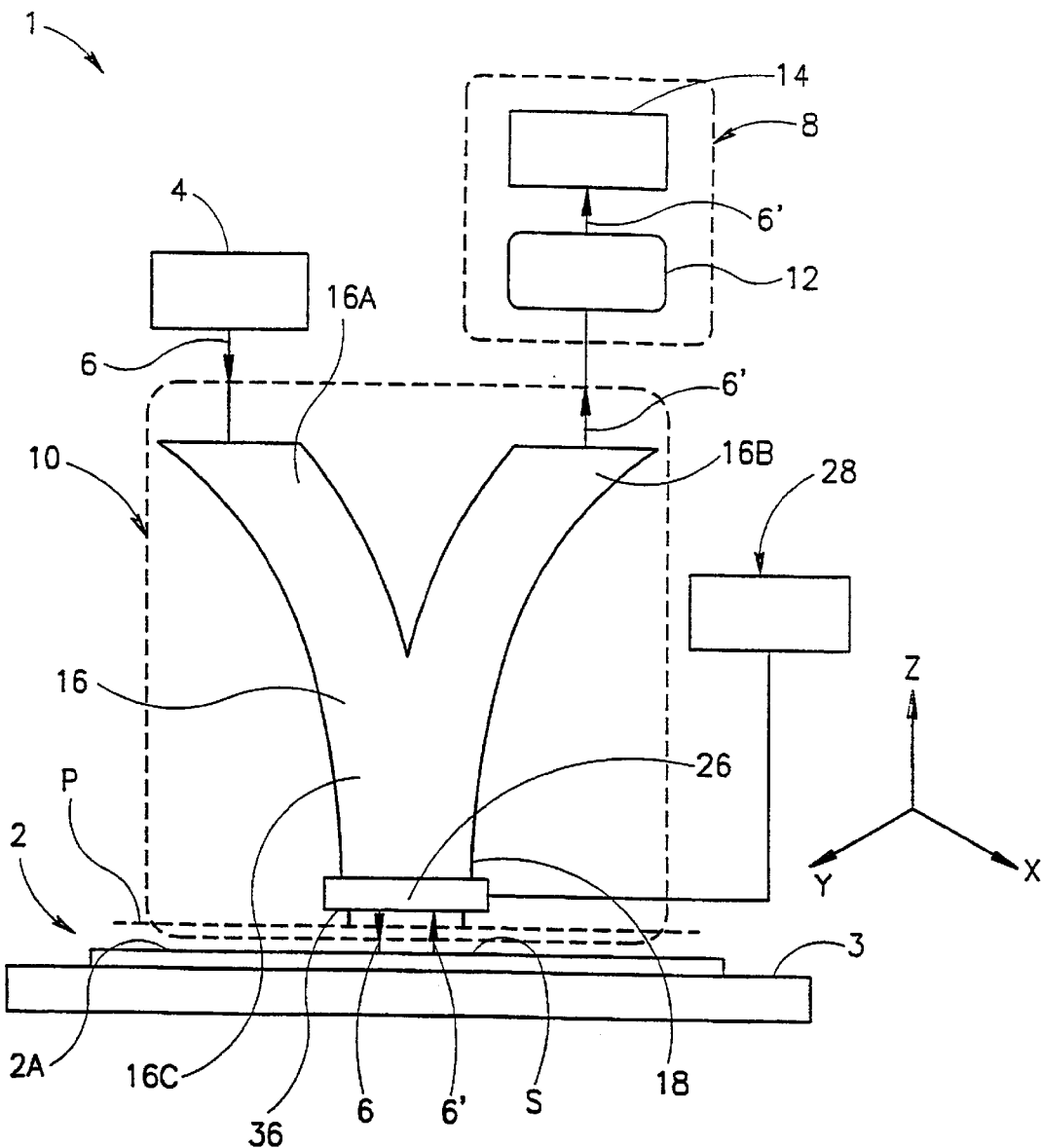
FIG. 1 is a schematic block diagram illustrating the main components of an apparatus constructed according to the invention.

Referring to FIG. 1, there is illustrated an inspection apparatus, generally designated 1, constructed and operated according to the main principles of the invention. The apparatus 1 is associated with an article 2, for inspecting its upper surface 2a to locate defects, if any. The article 2 is supported on an inspection table 3, the surface 2a being positioned within an inspection plane.

The apparatus 1 comprises a laser device 4 (constituting a light source unit) that generates an incident radiation 6; an imaging system, generally at 8; and a light directing system, generally at 10. The laser device 4 is equipped with suitable optics, which is not specifically shown. The construction and operation of the imaging system 8 do not form the part of the present invention and may be of any known type and, therefore, need not be described in detail, except to note that the following. It typically comprises imaging optics 12 and a detector unit 14. The detector unit 14 may comprise a conventional charge-coupled device (CCD) camera, which may optionally be equipped with a photocathod-electron multiplier, whose construction and operation are known per se.

One of the essential features of the present invention consists of that the light directing system 10 is designed like a fiber bundle 16. The fiber bundle 16 has two "starting branches" 16a and 16b combined into a single "final branch" 16c of a diameter D. The relationship between the fiber bundle 16 and the light source 4, imaging system 8 and inspected article 2, is shown in FIG. 1 in a self-explanatory manner. The free end 18 of the final branch 16c is positioned in the closest proximity to the surface 2a of the article.

Figure 2:
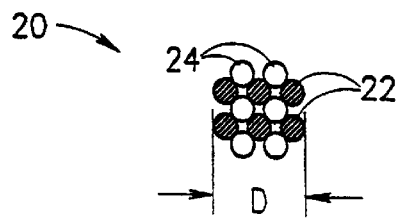
FIG. 2 is a schematic view, in an enlarged scale, of the outer surface of a fiber bundle used in the apparatus of FIG. 1.

FIG. 2 illustrates an outer surface 20 of the final branch 16c. The fiber bundle 16 is composed of two groups of fibers, so-called "illuminating fibers" and "collecting fibers" designated, respectively, 22 and 24. As shown in this specific example, each group includes six fibers. According to another essential feature of the invention, the illuminating and collecting fibers 22 and 24 are arranged or "mixed" within the final branch 16c in such a manner that each illuminating fiber 22 is surrounded by the collecting fibers 24 and vice versa.

Turning back to FIG. 1, the illuminating fibers 22 pass through the starting branch 16a and the final branch 16c so as to receive the incident light 6 from the laser 4 and direct it onto the surface 2a. The collecting fibers 24 pass through the branches 16b and 16c, being capable of collecting light 6' returned (scattered or emitted) from the illuminated surface and directing it onto the imaging system 8. The propagation of beams of light is shown here schematically solely in order to facilitate the understanding of the main principles of the construction of the apparatus 1. Thus, the incident light 6 passes through the illuminating fibers 22 and, when ensuring from the outer surface 20 of the final branch 16c, illuminates the surface area S on the article 2. The light components 6' returned from the surface area S enter the corresponding collecting fibers 24 and, when ensuring from the branch 16b, input the imaging system 8.

It will be readily understood that the illuminating fibers 22 project the incident radiation 6 onto the surface 2a in the form of a plurality of point-like light sources. The outer surface 22 of the fiber bundle 16 defines a horizontal pane P of the location of these point-like light sources. The surface 22 is polished to a planarity better than λ/10, where λ is the wavelength of the incident radiation. When visible light is used, the smoothness of the surface is better than about 10 nm. The mixing of the illuminating and collecting fibers within the end 18 of the fiber bundle 16 enables the illuminated surface area to be additionally increased. The total illuminated surface area S is defined by the diameter D of the final branch 16c of the fiber bundle 16. By moving the fiber bundle 16 in the X-Y plane relative to the article, the entire surface 2a can be inspected. Alternatively the article can be supported for horizontal movement relative to the stationary fiber bundle.

Another essential feature of the present invention is the provision of a holder 26 attached to the free end 18 of the fiber bundle 16 are provided with a control means for controlling the vertical position (along the Z-axis) of the plane P, as will be described more specifically further below. Although the scan operation is defined in the lateral dimension (X-Y plane), the vertical position of the fiber bundle relative to the surface 2a is variable. To this end, the holder is constructed so as to utilize the known principles of STM or ATM in order to maintain the desired vertical position of the fiber bundle during the scanning procedure.

As known, STM is based on the use of a small (on the order of atomic dimensions) conductive tip, which is positioned in the closest proximity of the surface of a sample under inspection. If the tip is brought to within a few atomic diameters of the sample, electrons, due to a tunneling mechanism, go between the tip and the sample, creating a tunneling current across the gap provided a potential difference exists between the tip and the surface. The tunneling current can be easily measured. Owing to the fact that the tunneling current is extremely sensitive (in exponential dependence) to the change of the distance between the tip and the surface, STM provides for a very sensitive measurement of the topology of the surface.

AFM, in distinction to STM, allows for inspecting non-conductive surfaces. AFM is based on the insight that, if atoms are approached to one another so closely that their electron clouds touch (i.e. there is a low-level overlap of the wave function of the front atom of a sharp tip with the surface atoms of the sample to be inspected) inter-atomic forces occur. More specifically, a sharp point is fixed to the end of a spring-like cantilever and is brought so close to the surface, that the forces occurring between the point and the surface deflect the cantilever. The deflection is detected by means of a tunnel tip disposed adjacent to the cantilever. The tunnel current then flowing across the gap between the cantilever and tunnel tip is maintained at a constant value by using any detected variations of the tunneling current to generate a correction signal. The correction signal is inter alia used to maintain the point-to-sample distance constant. Alternatively, the cantilever may be formed with a relative surface and the deflection of the cantilever may be detected by means of sensing light beam reflected from this surface.

Figure 3:
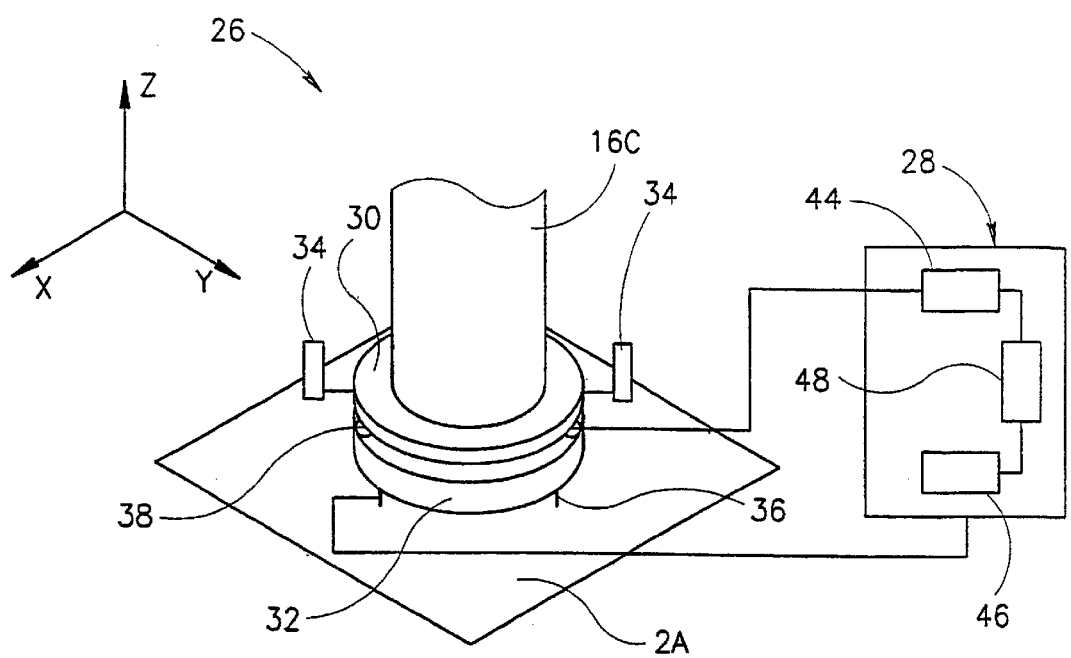
FIGS. 3 and 4 more specifically illustrate two different examples of a holder suitable for the apparatus of FIG. 1.

Referring to FIG. 3, there is illustrated that the holder 26 is composed of two spaced-apart parallel ring-shaped members 30 and 32 mounted on the end 18 of the fiber bundle 16. The uppermost ring 30 is held by coarse position tuning elements 34. The lowermost ring 32 which is made of an insulating material supports the end 18 of the fiber bundle and is provided with three sensing tips, generally at 36, only two of which are seen in the drawing. The ring 32 is held by a series of piezo crystals 38 (constituting a piezoelectric drive means) that control the motion of the ring 32 along the Z-axis by displacing it relative to the stationary ring 30. According to the example of FIG. 3, the tips 36 operate in the STM mode. To this end, the surface 2a is conductive and a potential difference is applied to the tips 36 and the surface 2a.

The construction and operation of the feed back electronic loop 28 are known per se and therefore need not be specifically described, except to note the following main features. It typically comprises: coarse control unit 44 associated with the drive means 38 for controlling the motion of the bundle along axis X-, Y- and Z-axes; a measuring unit 46 for measuring the tunneling current through the tips 36; and a processor unit 48 interconnected between the units 44 and 46. The processor 48 is equipped with appropriate hardware and is operated by suitable software for analyzing the measured data and generating a correction signal representative of the deviation of the distance between the tips 36 (i.e. the plane P). The correction signal is applied for driving the ring 32 accordingly and thereby maintaining article-to-bundle distance constant. It will be readily understood that the number of sensing tips 36 may vary from minimum three tips, which is sufficient to define the position of the plane P.

Figure 4:
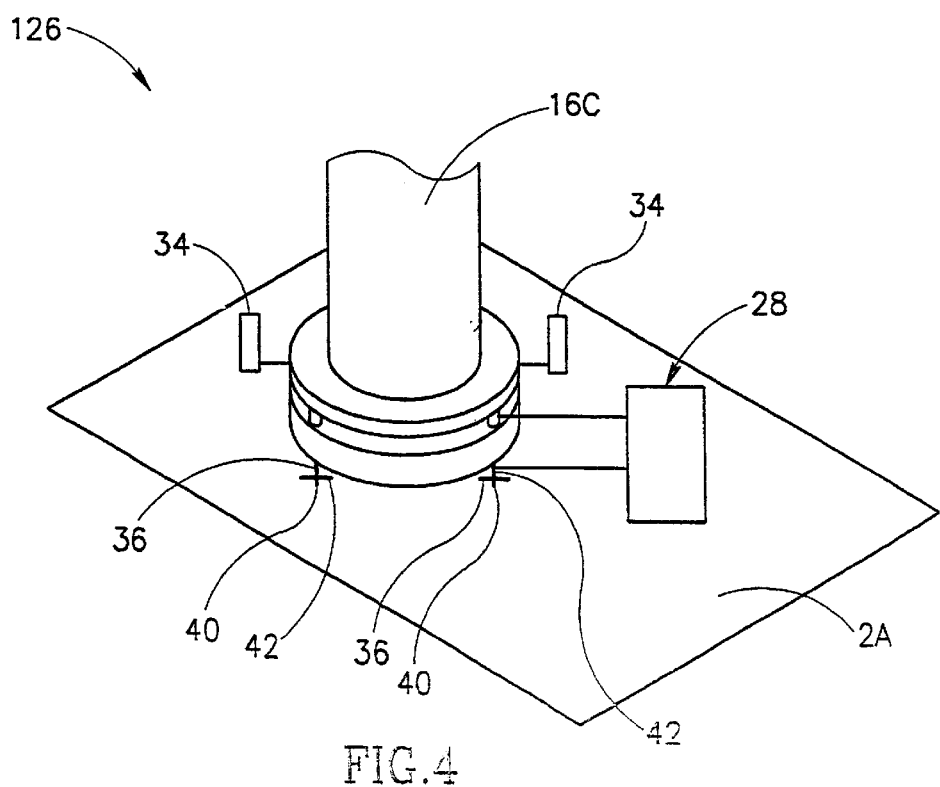

Turning now to FIG. 4, there is illustrated a holder, generally designated 126, constructed according to another embodiment, namely utilizing the principles of AFM mode for inspecting non-conductive articles. The same reference numbers are used for identifying those components that are identical in the holders 26 and 126, in order to facilitate understanding. In the holder 126, each of the tips 36 is provided with a sharp point 40 attached to the end of a spring-like cantilever 42. Each of the tips 36 is advanced towards the respective cantilever 42 and, owing to the fact that a suitable potential difference exists between them, a tunneling current will flow across the gap between the cantilever and tip.

Thus, the present invention, due to the provision of the fiber bundle 16, enables the scan area to be substantially increased without affecting the resolution of the scanning system. In both of the above-described examples, the tunnel current is a measure of the deviation of the distance between the plane P defined by the outer surface 20 of the fiber bundle 16 and that defined by the surface 2a.

Those skilled in the art will readily appreciate that various modifications and changes may be applied to the preferred embodiments of the invention as hereinbefore exemplified without departing from its scope as defined in and by the appended claims. For example, the piezoelectric drive means may be fabricated from disks of piezo ceramic; the number of tunnel tips may vary from minimum three; the feed back electronic loop may use any suitable mode of operation as long as it allows for detecting the deviation of the distance between the tips and the surface of the article to be inspected; the imaging system may be of any suitable known type.

What is claimed is:

1. An apparatus for optical inspection of an article utilizing near-field illumination, the apparatus comprising a light source unit generating incident light, a detector unit for sensing light signals and providing data representative thereof, a light detecting system, and a control means comprising sensing means and capable of adjusting the position of the light directing system relative to the surface of the article, the apparatus being characterized in that:

the light directing system comprises a fiber bundle which is composed of a group of illuminating fibers directing the generated light from the light source onto a surface area of the article, so as to illuminate said surface area with the group of a plurality of light components, and of a group of light collecting fibers collecting light returned from the illuminated surface area and directing the collected light towards the detector unit;

said sensing means comprises at least three sensing tips which are attached to an end of the fiber bundle which is to be located close to the surface of the article, when in an operational position of the apparatus, and are arranged so as to define a single common plane, a tunneling current through the tips being thereby indicative of a distance between the surface of the article and said plane defined by said at least three tips.

2. The apparatus according to claim 1, wherein said control means comprises:

a holder (26) supporting the fiber bundle (16) for movement in a direction perpendicular to a plane defined by the surface (2a) of the article (2), and carrying said at least three sensing tips to be close to the surface of the article;

a drive means (38) for actuating the holder (26) for said movement; and a feed back electronic loop (28) coupled to the sensing means (36) and drive means (38) so as to detect deviations of the distance between the tips and the surface (2a) and operate the drive means accordingly.

3. The apparatus according to claim 2, wherein the sensing tips operate in a scanning tunneling microscopy mode.

4. The apparatus according to claim 2, wherein the sensing tips operate in an atomic force microscopy mode, each of said tips being provided with a cantilever capable of being deflected by forces occurring between the point and the surface of the article.

5. The apparatus according to claim 2, wherein said feed back electronic loop (28) comprises:

a measuring unit (46) for measuring the tunneling current and providing measured data representative thereof;

a processing unit (48) processing the measured data and generating a correction signal representative of the deviation of the distance between the tips (36) and the surface (2a).

6. The apparatus according to claim 1, wherein those ends of the illuminating and collecting fibers which are located close to the surface (2a) of the article (2), when in the operational position of the apparatus, are mixed, such that each illuminating fiber (22) is surrounded by the collecting fibers (24) and vice versa.

* * * * *